United States Patent [19]

Dierksmeier et al.

[11] 4,195,658
[45] Apr. 1, 1980

[54] RESETTABLE SAFETY VALVE

[76] Inventors: Jorge Dierksmeier, 325 NW. 187 St., Miami, Fla. 33169; Joseph J. Pasint, 3781 SW. 32 Ct., Hollywood, Fla. 33023

[21] Appl. No.: 960,837

[22] Filed: Nov. 15, 1978

[51] Int. Cl.² ............................................. F16K 17/00
[52] U.S. Cl. .................................... 137/462; 137/498; 137/517
[58] Field of Search ................ 137/460, 462, 517, 498

[56] References Cited

U.S. PATENT DOCUMENTS

| | | | |
|---|---|---|---|
| 2,664,101 | 12/1953 | Betancourt | 137/460 |
| 3,618,689 | 11/1971 | German | 137/462 |
| 3,664,368 | 5/1972 | Sweeney | 137/517 X |
| 4,010,770 | 3/1977 | Peters | 137/462 X |

*Primary Examiner*—Harold W. Weakley

[57] ABSTRACT

An improved resettable safety valve for preventing the escape of gas from a closed gaseous system wherein an inlet line is attached to the inlet chamber of the valve and an outlet line is attached to the outlet chamber of the valve. The valve comprises a housing wherein a piston-like plug with a head at one end and a rod-like body at the other end are contained within the housing. The housing includes an inlet chamber sized such that the plug head is movable laterally within the chamber. The housing includes a main chamber adjacent the inlet chamber and along the same axis as the inlet chamber and an outlet chamber adjacent the main chamber and along the same axis the main chamber sized such that the rod-like end of the plug fills the chamber at one end thereby preventing the flow of gas through the outlet chamber when the rod-like body is within the outlet chamber. The housing includes two stack-like chambers which are perpendicular to the main chamber having a septum adjacent each chamber thus separating the chambers. The stack-like chambers having a first end with an opening in the main chamber and a second open end. A cap normally abuts the second end of the stack-like chambers and is movable with respect to the opening.

5 Claims, 4 Drawing Figures

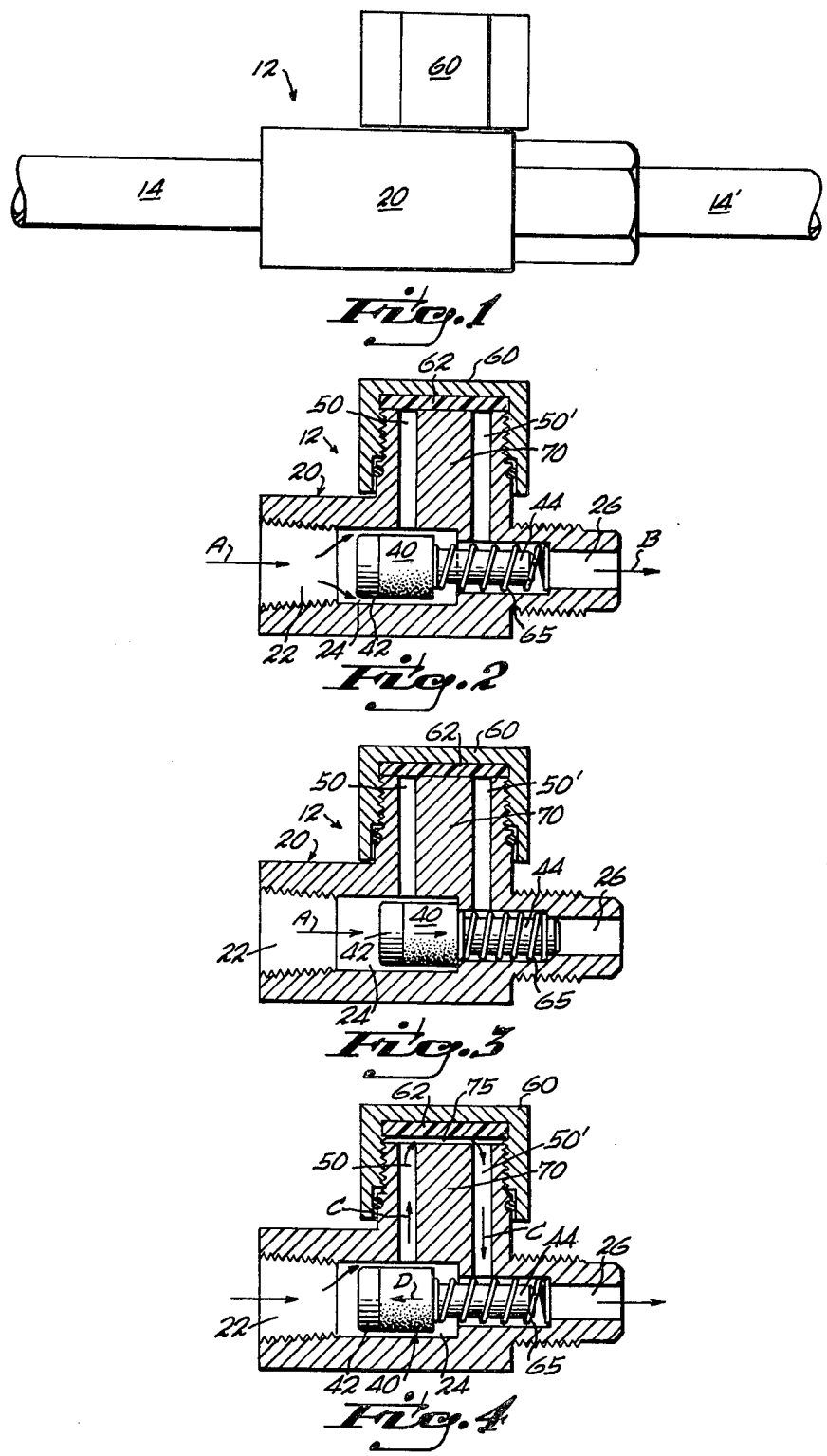

RESETTABLE SAFETY VALVE

FIELD OF THE INVENTION

This invention relates to an apparatus for valves and more particularly the invention relates to an apparatus for resettable check valves in a closed gaseous system.

BACKGROUND OF THE INVENTION

In the past there have been numerous structures for valves. There have been structures for resettable check valves. There have even been structures for resettable check valves in a closed gaseous system. However, there have been no resettable check valves which are activated as a result of a pressure imbalance occurring in the line at a position behind the valve in the closed gaseous system. For instance, when a refrigeration system breaks down due to normal vibration of the compressor, it is usually necessary to shut down the entire system to prevent the escape of gas from the system into the atmosphere. However, huge amounts of gas from the system may escape into the atmosphere before the break in the line is detected and the system can be shut down. As may be recalled, recent studies have shown that fluorocarbons leaking into the atmosphere from a building's air conditioning unit is a suspect cause of Legionnaire's Disease.

Applicant's invention solves the problem of fluorocarbons leaking into the air by providing a resettable check valve in the system such that if a break in the line occurs after the position where the valve is installed, the flow of gas through the valve will be shut off instantaneously. Thus, applicant's invention prevents the leakage of fluorocarbons (or other gaseous material) in the system into the atmosphere where it could cause harmful effects to human beings or other living things.

After a period of time, it is desirable to check the controls (gauges or the like) in a closed gaseous system. In the past, it was necessary to shut down the entire system to check or change the controls in order to prevent the leakage of the gas in the system into the atmosphere. Using applicant's invention, it is no longer necessary to shut down the entire system to perform the operation described above. The user merely removes the outlet line from the valve and the valve reacts to the pressure imbalance caused thereby and the valve automatically closes preventing the leakage of fluorocarbons (or other gaseous material) in the system from leaking into the atmosphere. Thus, the only portion of the system which need be shut down is that portion where the controls are located. By performing the operation in this manner, the user is able to save the gas in the system which protects the atmosphere, a great deal of expense because he need not replace the gas in the system, and the user need not restart the entire system because the entire system was not shut down. Thus, quick and efficient access to the controls in the system is available using applicant's invention.

Moreover, in the past is has been necessary to restart the entire system after a break in the system has occurred or when it became necessary to check or change the system's controls. Using applicant's invention, the valve, this is no longer necessary. Thus, the complete restart procedure has been eliminated and replaced by a simple procedure wherein the user merely loosens the cap on the valve which equalizes the pressure as described below and, wherein the pressure in the valve is equalized thus the plug blocking the outlet chamber is normally urged by a spring toward the inlet chamber thus allowing the resumption of normal operation of gas flowing through the valve. This entire operation takes only a minute and the pressure is equalized and normal operation can be resumed.

Thus, applicant's invention, the valve, saves time and energy and generally promotes the health, safety, and welfare of the public at large as well as the individual user.

OBJECTS OF THE INVENTION

The object of this invention is to provide a simple, clear and inexpensive means for preventing the escape of fluorocarbons (or other gaseous material) in the system into the atmosphere.

Another object of this invention is to provide a valve means for immediately responding to a pressure imbalance in the line due to a break in the line which closes off the line thereby preventing the escape of fluorocarbons into the atmosphere.

Another object of this invention is to provide a means for quick and efficient replacement of the controls of a gaseous system such that no gas escapes into the atmosphere during the operation.

A further object of this invention is to provide a means for protecting the atmosphere by preventing the escape of fluorocarbons or other harmful gaseous material into the air which could potentially destroy the ozone layer and have other deleterious effects on our delicate eco-system.

A further object of this invention is to provide a means for enabling a user to change controls on a closed gaseous system without the loss of expensive fluorocarbons into the atmosphere when he changes or checks the controls of his closed gaseous system.

Another object of this invention is to provide a quick and efficient restart means when a break in the system occurs.

In accordance with these and other objects which will become apparent hereinafter, the instant invention will now be described with reference to the accompanying drawings in which:

DESCRIPTION OF THE DRAWINGS

FIG. 1 is a elevational view of the valve showing the inlet and outlet lines.

FIG. 2 is a sectional view of the valve showing the normal operation of the system wherein gas flows through the inlet line through the valve and to the outlet line.

FIG. 3 is a sectional view of the valve showing the valve when a pressure imbalance occurs in the system.

FIG. 4 is a sectional view of the valve showing the valve in the reset mode wherein gas flows through the vertical chambers thereby equalizing the pressure imbalance such that the normal flow of the gas is resumed.

DESCRIPTION OF THE PREFERRED EMBODIMENT

Referring to the drawings wherein like referenced characters designate like or corresponding parts throughout the several views and referring particularly to FIG. 1, there is shown the valve, generally designated by the numeral 12. As can be seen from FIG. 1, there is an inlet line 14 and an outlet line 14'. As can be seen in FIG. 2, the gas flows from the inlet line 14 through the valve as indicated by arrow A and through the valve into the outlet line as indicated by arrow B.

With particular reference to FIG. 2 there is shown the valve 12. The valve includes a housing 20 having an inlet chamber 22 wherein the inlet line 14 is connected to the inlet chamber 22 and gas flows through the inlet line to the inlet chamber 22 as indicated by arrow A. The gas flows through the inlet chamber 22 to a main chamber 24. In the main chamber 24 there is shown a piston-like plug 40 with a head 42 and a rod-like body 44. The gas normally flows over the plug and fills the two vertical stacked-like chambers 50 and 50'. Under normal conditions, the gas is trapped in those vertical chambers 50 and 50' because a cap 60 and a gasket 62 close off the openings of each stack 50 and 50'. Thereby, the pressure is equalized and gas flows over the plug through the main chamber and through the outlet chamber 26 to the outlet line 14' as indicated by arrow B. As seen in FIG. 2, there is provided a spring 65 which abutts the outlet chamber 26. The rod-like body 44 is positioned through spring 65 such that head 42 is normally urged to the inlet chamber 22 and generally in the opposite direction of the gas flow.

With particular reference to FIG. 3, there is shown the valve in the closed position such that the rod-like body 44 plugs the outlet chamber 26 thereby preventing the flow of gas through the outlet chamber 26. When a break in the system occurs, a pressure imbalance is created between the outlet line and the inlet line. It is this pressure imbalance which causes the gas to rush at a rate great enough to force the head of the plug toward the outlet chamber and against the normal tension of the spring 65. The rod-like body 44 fills the opening of the outlet chamber 26 thereby preventing the flow of gas through the outlet chamber. Thus the system is effectively kept closed by the plug moving into the outlet chamber and preventing the flow of gas toward the break in the line. The break in the line can be caused by a rupture of the line itself or a removal of the outlet line 14' from the valve when it becomes necessary to change the system controls. In either event, a pressure imbalance is created causing the gas to rush at a faster than normal rate through the valve which causes the plug to be moved in the direction of the outlet chamber 26.

With particular reference to FIG. 4 there is shown the valve in the reset mode. When the break in the line has been fixed there is still a pressure imbalance within the valve itself. Thus, the rod-like body fills the valve outlet chamber 26 preventing the flow of gas through the valve even after the break in the line has been fixed. In order to equalize the pressure within the valve, the cap 60 is loosened allowing the gas to flow from stack-like chamber 50 over the septum 70 through the opening 75 created by the movement of the cap to the stack-like chamber 50' as indicated by arrow C. Thus, a return flow is created when the cap 60 is moved upward as shown in FIG. 4. The gas proceeds down stack-like chamber 50' into the main chamber 24 over the rod-like end 44 and spring 65 to the plug head 42 in the direction indicated by arrow D and thus moving the head 42 toward the inlet opening 22 in the direction indicated by arrow D. In this way the spring 65 may normally urge the rod-like end 44 of the plug out of the outlet chamber thereby allowing the normal flow of gas through the valve.

The entire operation to restart the system in the above described manner takes less than one minute, a considerable savings in time, energy and money over shutting down the system and having to restart it by conventional means.

It is thus seen there is provided a simple and inexpensive installation to guard against the escape of fluorocarbons (or other gaseous material) contained in the system into the atmosphere which may be installed on closed gaseous system line with a minimum of expense and wasted time.

While the instant invention has been shown and described herein what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An improved resettable safety valve for preventing the escape of gas from a closed system wherein an inlet line and an outlet line are connected to the valve, the valve comprising:

a piston-like plug including a head at one end and a rod-like body at the other end, a housing having
 an inlet chamber, sized such that the plug can enter the inlet chamber,
 a main chamber adjacent the inlet chamber and along the same axis as the inlet chamber,
 an outlet chamber adjacent the main chamber and along the same axis as the main chamber sized to accept the rod-like end of the plug thereby preventing the flow of gas through the outlet chamber when the rod-like body is within the outlet chamber, and
 two stack-like chambers perpendicular the main chamber with a septum adjacent each chamber and separating the chambers thereby, and each chamber having a first end with an opening into the main chamber and a second open end, a cap in normal abutting relation to the second openings of the two stack-like chambers and movable thereto, thereby preventing the flow of gas out of each of the openings unless the cap is slightly raised above the opening, in which event gas will be permitted to flow from one stack second opening to the other, the housing including means for securing the cap to the housing and the means for securing the cap to the housing allowing the cap to be movable with respect to the second opening of the stack-like chambers.

a spring abutment shouldering that portion of the outlet chamber adjacent the main chamber, a spring within the housing abutting the spring abutment and being within the main chamber, the spring's diameter being sized to accept the rod-like end of the plug through the spring, the plug within the chamber with the rod-like end through the spring and the spring normally urging the plug head toward the inlet chamber thereby gas entering the inlet chamber may flow through the inlet chamber through the main chamber through the outlet chamber into the outlet line, however, should a break in the line occur a low pressure area will be created causing the plug to move against the spring with a predetermined force such that the rod-like end of the plug will close off the outlet chamber and no gas will be permitted through the outlet chamber, when the break is repaired, the cap may be moved above its abutting relation to the second opening of the stack-like chambers thereby causing the pressure to become equalized thus allowing the spring to normally urge the plug away from the outlet chamber thereby allowing gas to pass through the valve, and the cap may be returned to its normal abutting position on the second opening of the stack-like chambers.

2. An improved resettable safety valve as in claim 1 wherein that portion of the housing adjacent the two vertical stack-like chambers defines thread means for enabling the cap to be moved toward and away from the second opening of the two vertical stack-like chambers.

3. An improved resettable safety valve as in claim 1 or claim 2 wherein the cap also includes a gasket which normally abuts and closes off the two vertical stack-like chambers' second opening.

4. An improved resettable safety valve as in claim 3 wherein that portion of the housing adjacent the outlet and inlet chambers includes means for attaching the inlet and outlet lines to the valve.

5. An improved resettable safety valve as in claim 4 wherein the means for attaching the inlet and outlet lines to the valve comprises thread means.

* * * * *